United States Patent [19]
Ottleben

[11] Patent Number: 5,155,350
[45] Date of Patent: Oct. 13, 1992

[54] LIGHT GATE WITH ADJUSTABLE LIGHT TRANSMITTER

[76] Inventor: Bernd Ottleben, Butenbergsfeld 10, 3202 Bad Salzdetfurth, Fed. Rep. of Germany

[21] Appl. No.: 704,768

[22] Filed: May 24, 1991

[51] Int. Cl.$^5$ ............................................. G01J 1/32
[52] U.S. Cl. ................................. 250/205; 250/222.1
[58] Field of Search .................... 250/205, 221, 222.1, 250/214 C, 214 AG; 307/311

[56] References Cited

U.S. PATENT DOCUMENTS

| | | | |
|---|---|---|---|
| 4,074,128 | 2/1978 | Harris, Jr. et al. | 250/205 |
| 5,008,532 | 4/1991 | Ono et al. | 250/222.1 |
| 5,026,978 | 6/1991 | Misumi et al. | 250/205 |

FOREIGN PATENT DOCUMENTS

| | | |
|---|---|---|
| 3124464 | 3/1982 | Fed. Rep. of Germany. |
| 3541002 | 5/1986 | Fed. Rep. of Germany. |
| 3733256 | 4/1989 | Fed. Rep. of Germany. |

OTHER PUBLICATIONS

"Konstruktion und Elektronik", May, 1989, p. 14.

*Primary Examiner*—David C. Nelms
*Assistant Examiner*—Que T. Le
*Attorney, Agent, or Firm*—Foley & Lardner

[57] ABSTRACT

A light switching device has a transmitter for generating light, a control circuit for controlling the light transmitted by said transmitter and a receiver for receiving the transmitted light. The receiver generates an indication signal which varies with the intensity of the received light. The device includes a first comparator having a first input for receiving the indication signal and a second input for receiving a first reference voltage. The first comparator produces a first comparison signal having a first state when said first reference voltage is greater than the indication signal and a second state when the first reference voltage is less than said indication signal. A second comparator is also provided and has a first input for receiving the indication signal and a second input for receiving a second reference voltage which is different from the first reference voltage. The second comparator produces a second comparison signal having a first state when said second reference voltage is greater than said indication signal and a second state when the second reference voltage is less than the indication signal. A charge storage device, coupled to the first comparator stores a charge amount which varies based on the first comparison signal, wherein the storage device increases the charge amount when said first comparison signal is in one of the first and second states, and decreases the charge amount when the first comparison signal is in the other of the first and second states.

17 Claims, 3 Drawing Sheets

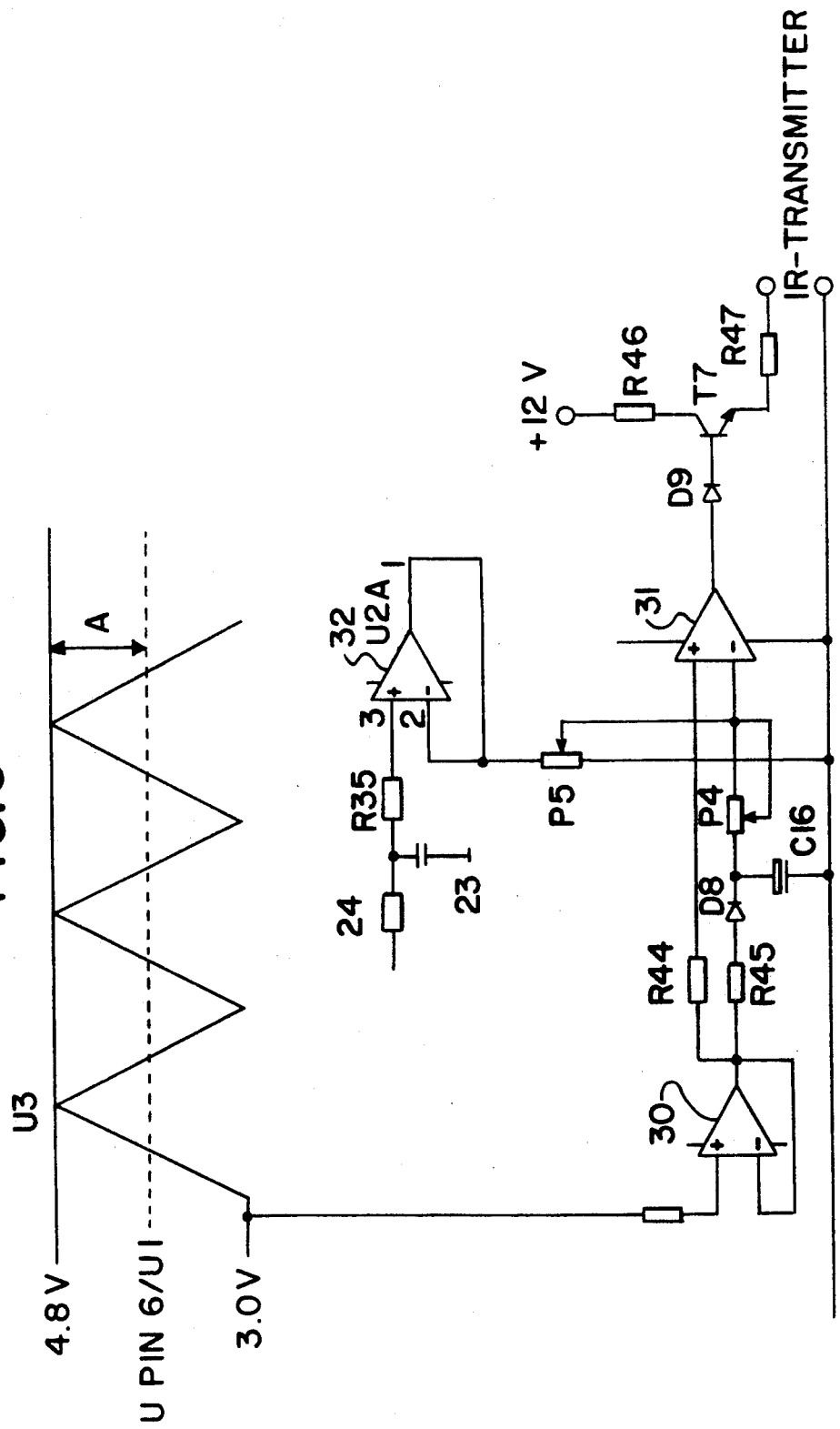

LIGHT GATE WITH ADJUSTABLE LIGHT TRANSMITTER

BACKGROUND OF THE INVENTION

The invention relates to a light switching device or light gate having an optical transmitter for emitting light pulses, an optical receiver for receiving the light pulses, a drive circuit for the optical transmitter having an adjusting device for the output power of the optical transmitter, a recognition circuit for the received light pulses having a generator for an indication signal proportional to the intensity of the received light pulses, and having a display for indicating a low level of received light.

Such light gates are known. In order to drive them and to trigger the switching process controlled by the light gate, use is regularly made of an integrated PLL, which on the one hand produces the clock pulse for the light pulses radiated by the light transmitter, and on the other hand compares the received light pulses with the generated light pulses with regard to frequency and phase. If a signal corresponding to the emitted pulse signal is not received, a switching signal is generated, for example a relay is switched over, in order to initiate the processes to be triggered by the light gate. A d.c. voltage signal which is proportional to the intensity of the received light pulses is present at one output of this integrated circuit (IC). In known light gates, this d.c. voltage signal is used to indicate a low intensity of the received light signals, which endangers a reliable evaluation of the received signals, and is generally ascribed to contamination of the optical transmitter and/or receiver.

The lighting up of, for example, a red light-emitting diode, effected thereby informs the user of the light gate that a new adjustment must be undertaken, generally by raising the gain of the input amplifier for the received light pulses. It is, however, also known to raise the output power of the optical transmitter in order to achieve a higher received power for the received light pulses. The readjustment is undertaken manually on the basis of the alarm signal.

The journal "Konstruktion und Elektronik" of May 10, 1989, page 14 discloses a light gate in which the drop in the signal level at the receiver is compensated for automatically by an automatic rise in the gain. Because of the reduction in the signal-to-noise ratio connected with this, the operational reliability is no longer guaranteed in the case of heavy contamination.

A light gate intended for counting banknotes is described in DE 31 24 464 A1. The banknote passes through the arrangement of an optical transmitter and an optical receiver. The device is switched on at the start of the counting process. Here, the optical transmitter is controlled in such a way that it radiates at maximum intensity. The intensity of the optical transmitter is reset in steps as a function of the signal received by the optical receiver until a prescribed received intensity is reached at the optical receiver. The transmitting power of the optical transmitter is thus adjusted in accordance with the criterion of the received light power. Since the optical transmitter is driven by a d.c. voltage, the arrangement is not suitable for normal light gates, because of its vulnerability. Useful operation results only on the basis of the short distance between the optical transmitter and optical receiver, and the interference effects connected therewith.

It is known from DE 37 33 256 A1 to vary the constant current flowing through an incandescent lamp by means of the manual adjustment of the sensitivity of an evaluation circuit for the light of the incandescent lamp received by a phototransistor. The light gate is intended for controlling a sewing machine, in which the light passes through the material. In the case of a thin material, the full light power of the incandescent lamp is not required, so that a reduction in the light power is possible by reducing the current flowing through the incandescent lamp, so that the service life of the incandescent lamp is increased.

It is known in principle, for example from DE 35 41 002 A1, to keep the output power of a light source, for example a laser light source, constant by measuring a portion of the luminous flux and comparing it with a comparison value.

SUMMARY OF THE INVENTION

The invention is directed to a light gate that permits automatic compensation for maladjustments or contamination without impairing the operational reliability thereof. More particularly, the invention is directed toward a light switching device comprising:

a) a transmitter for generating light;
b) a control circuit for controlling the light transmitted by said transmitter;
c) a receiver for receiving the light, the receiver generating an indication signal varying with the intensity of the received light;
d) a first comparator having a first input for receiving the indication signal and a second input for receiving a first reference voltage, the first comparator producing a first comparison signal having a first state when the first reference voltage is greater than the indication signal and a second state when the first reference voltage is less than the indication signal;
e) a second comparator having a first input for receiving the indication signal and a second input for receiving a second reference voltage, different from the first reference voltage, the second comparator producing a second comparison signal having a first state when the second reference voltage is greater than the indication signal and a second state when the second reference voltage is less than the indication signal;
f) a charge storage device, coupled to the first comparator for storing a charge amount which varies based on the first comparison signal, the storage device increasing the charge amount when the first comparison signal is in one of the first and second states, and decreasing the charge amount when the first comparison signal is in the other of the first and second states;
g) a switching unit interposed between the first comparator and the charge storage device for connecting and disconnecting the first comparison signal to the charge storage device in response to the second comparison signal; and
h) the control circuit coupled to the charge storage device for adjusting the transmitter in response to the charge amount.

In the light gate according to the invention, the output power of the light transmitter is regulated in such a way that the received light power remains constant. It is insured for the first time in this way that the light gate always has the same "penetrating power". In this manner, one may insure that the light gate does not react in the course of time to semi-transparent objects to which it had not reacted upon initially. The construction of the light gate according to the invention further insures that the adjusted transmitter power of the light transmitter is once again immediately present even if the light gate has been interrupted for a lengthy time. To be precise, in this case the regulating mechanism which is exercised via the first comparator is switched off by the second comparator. The second comparator and the switching unit connected to it insure that the signal latch does not vary its signal value, which is essential for controlling the transmitting power.

In order to control the transmitting power, the control unit can vary the amplitude of the light pulses as a function of the signal value of the signal latch. In this case, the duty cycle of the light pulses remains unchanged. This construction of the control unit facilitates a wide control range.

In an alternative embodiment, the control stage varies the duty cycle of the light pulses as a function of the signal value of the signal latch. In this case, the amplitude remains unchanged. This renders possible a very fine regulation, but the control range that can be adjusted is limited.

In one simple embodiment of the invention, the signal latch can be a capacitor, which can be charged and discharged as a function of the switching-through process of the first comparator. This can be realized in a simple way when the first comparator connects the capacitor plate not connected to a voltage source to ground or to the potential of the voltage source by means of the switching-through process of the first comparator, it also being possible for the charged plate of the capacitor to be connected directly to the output of the comparator if the latter is formed by an operational amplifier, which normally has a high or a ground (low) potential at the output, depending on the comparison carried out.

The switching thresholds of the two comparators can preferably be adjusted by potentiometers, so that the desired value, or else the "penetration" can be adjusted by the system. Preferably, the second potentiometer, whose tap is connected to the first comparator, is connected to the tap of the first potentiometer that is connected to the second comparator. The two potentiometers are thus connected in series with the first comparator. Via them, the reference voltages preferably reach the relevant inputs of the comparators.

BRIEF DESCRIPTION OF THE DRAWINGS

The invention is to be explained in more detail below with reference to exemplary embodiments represented in the drawing, wherein:

FIG. 3 illustrates a block diagram of a circuit providing trigger, control and driver functions.

DETAILED DESCRIPTION OF THE PREFERRED EMBODIMENTS

The terminology "light gate" and "light pulses" also normally covers arrangements which operate using electromagnetic waves not situated in the visible region. Consequently, the present invention is also intended to cover such arrangements in which infrared waves or electromagnetic waves in the ultraviolet are used.

Figure 1:
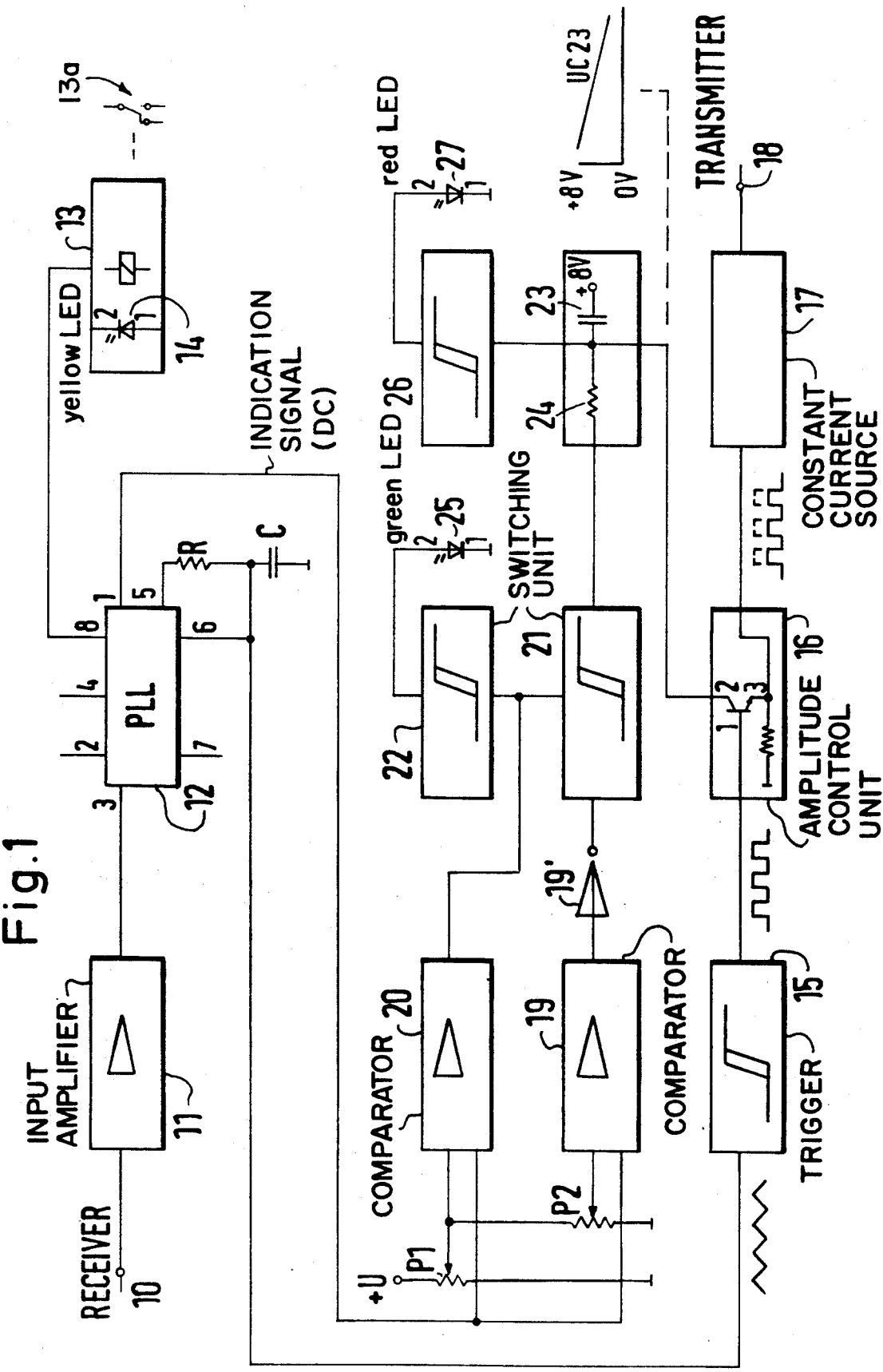
FIG. 1 shows a block diagram for regulating a light gate having an amplitude control stage.

In the arrangement represented in FIG. 1, the emitted light waves (in the form of infrared waves) are received by a light receiver 10 designed for the infrared region, and are directed via an input amplifier 11 to an input 3 of a PLL-IC 12. Present at the output 6 of the PLL-IC 12 is a delta voltage generated in the PLL-IC 12, from which—as is explained in more detail below—the light pulses are derived. A comparison of the received light pulses with the delta voltage present at the output 6 takes place in the PLL-IC 12. If the signals correspond in frequency and phase, a "low" signal is present at the output 8 of the PLL-IC 12, while if they do not correspond, a "high" signal is generated. The "high" signal switches a relay 13 through, and causes a yellow indicator diode 14 to light up. The yellow indicator diode 14 is a signal that the light gate has detected an object and triggered a corresponding process by means of the relay 13 and switched contacts 13a.

The delta voltage present at the output 6 of the PLL-IC 12 is fixed in its frequency by the RC circuit at the input 5. The delta voltage reaches a trigger 15, which forms a pulse train with square-wave pulses. Via an amplitude control unit 16 described in more detail below, the amplitude of the pulses of the square-wave pulse train is fixed, and a corresponding constant-current source 17 is triggered which, for its part, controls a light transmitter 18 in the form of a light-emitting diode. The light-emitting diode 18 thus emits light pulses, whose amplitude waveform corresponds to the amplitude waveform at the output of the amplitude control unit 16.

The control loop is closed via the receiver 10 to the PLL-IC 12.

Present as an indication signal at the output 1 of the PLL-IC 12 is a d.c. voltage, whose value is dependent on the amplitude of the light pulses received by the receiver 10. The output 1 of the PLL-IC 12 is connected to first inputs of a first comparator 19 and of a second comparator 20. The other input of the second comparator 20 is connected to the tap of a first potentiometer P1, at which a d.c. voltage +U is present. Furthermore, connected to the tap of the first potentiometer P1 is a second potentiometer P2, whose tap is connected to the other input of the first comparator 19. The comparators 19, 20 generate a "high" signal at their outputs when the voltage supplied at the taps of the potentiometers P1, P2 exceeds the voltage fed to the first inputs, supplied at the output 1 of the PLL-IC 12. Since the output voltage at the terminal 1 of the PLL-IC 12 is inversely proportional to the amplitude of the received light pulses, at the start of operation of the light gate a minimum output signal is present at the terminal 1 of the PLL-IC 12, in the case of correct adjustment. The second comparator 20 therefore generates a "high" signal at the output, and switches through two switching units 21, 22 connected to it. The switched-through switching unit 21 produces a connection from the comparator 19 through a resistor 24 to a capacitor 23, one plate of which is connected to a +8 V voltage source.

If the output of the first comparator is "high", a downstream invertor 19' switches its output "low" and connects to ground potential the plate of the capacitor 23 that is not connected to the voltage source, so that the capacitor 23 charges. The rate of charging is determined by resistor 24 located in series with the capacitor 23. The amplitude control unit 16 is connected to the plate of the capacitor 23 that is not connected to the +8 V voltage source. The amplitude of the pulses at the output of the amplitude control unit 16 is reduced by the drop in the potential at the plate of the capacitor that is not connected to the voltage source (charging of the capacitor). The transmitter 18 thus emits light pulses of smaller amplitude, as a result of which the receiver 10 naturally receives light pulses of smaller amplitude and directs a corresponding signal to the PLL-IC 12. As a result, the voltage increases at the output 1 of the PLL-IC 12 and, consequently, at the inputs of the comparators 19, 20. Because of the lower threshold value set by potentiometer P2 as compared with P1, the first comparator 19 switches through and assumes
a "low" signal at its output, so that the downstream invertor 19' has a "high" signal at its output. Consequently, the charged capacitor 23 is discharged again, the plate not connected to the +8 V voltage source assuming a more positive potential. Owing to the more positive potential of that plate, the amplitude of the pulse train at the output of the amplitude control unit 16 is raised once again, as a result of which the transmitting power of the transmitter 18 rises. This leads via the receiver 10 to a drop in the voltage at the output 1 of the PLL-IC 12, so that the comparator 19 switches through once again, and the "low" signal is present once again at the output of the invertor 19', as a result of which the capacitor 23 charges once again and effects a reduction in the amplitude at the output of the amplitude control unit 16. In this way, the transmitting power of the transmitter 18 fluctuates about the desired value fixed by the potentiometer P2. Contamination in the transmitter-receiver path leads to a drop in the amplitude of the received light waves and thus to a rise in the transmitter power, since the control criterion is a constant amplitude at the input 3 of the PLL-IC 12.

The switching unit 22, controlled by the second comparator 20, controls a green light-emitting diode 25 which indicates that an optimum transmitter power has been reached. The switching unit 25 interconnects a power source (not shown) to the LED 25 to power some.

If the light path between the transmitter 18 and receiver 10 is interrupted, the voltage at the output 1 of the PLL-IC 12 rises until the second comparator 20 switches through (i.e., produces a "low" output. As a result, the switching units 21, 22 are opened, so that the green light-emitting diode 25 goes out and the connection between the capacitor 23 and the output of the comparator 19 or of the invertor 19' is interrupted. Consequently, neither a charging nor a discharging process takes place at the capacitor 23. It can retain its charge virtually unchanged over many hours, so that in the case of later unblocking of the light path between the transmitter 18 and the receiver 10 the control value previously reached for the amplitude is once again immediately available.

It is possible by means of the potentiometer P1 to adjust the "penetration" of the light gate system to the particular case. For example, for the purpose of regulating wash installations it can be necessary to recognize the curved windshield of an automobile, in order to raise a drying nozzle and not to let it run against the windshield. By contrast, another light gate must be insensitive to heavy water spray, and not have to identify an object until, for example, a completely opaque tire comes into the beam path. These requirements placed on the light gate can be fulfilled by adjusting the potentiometer P1.

Figure 2:
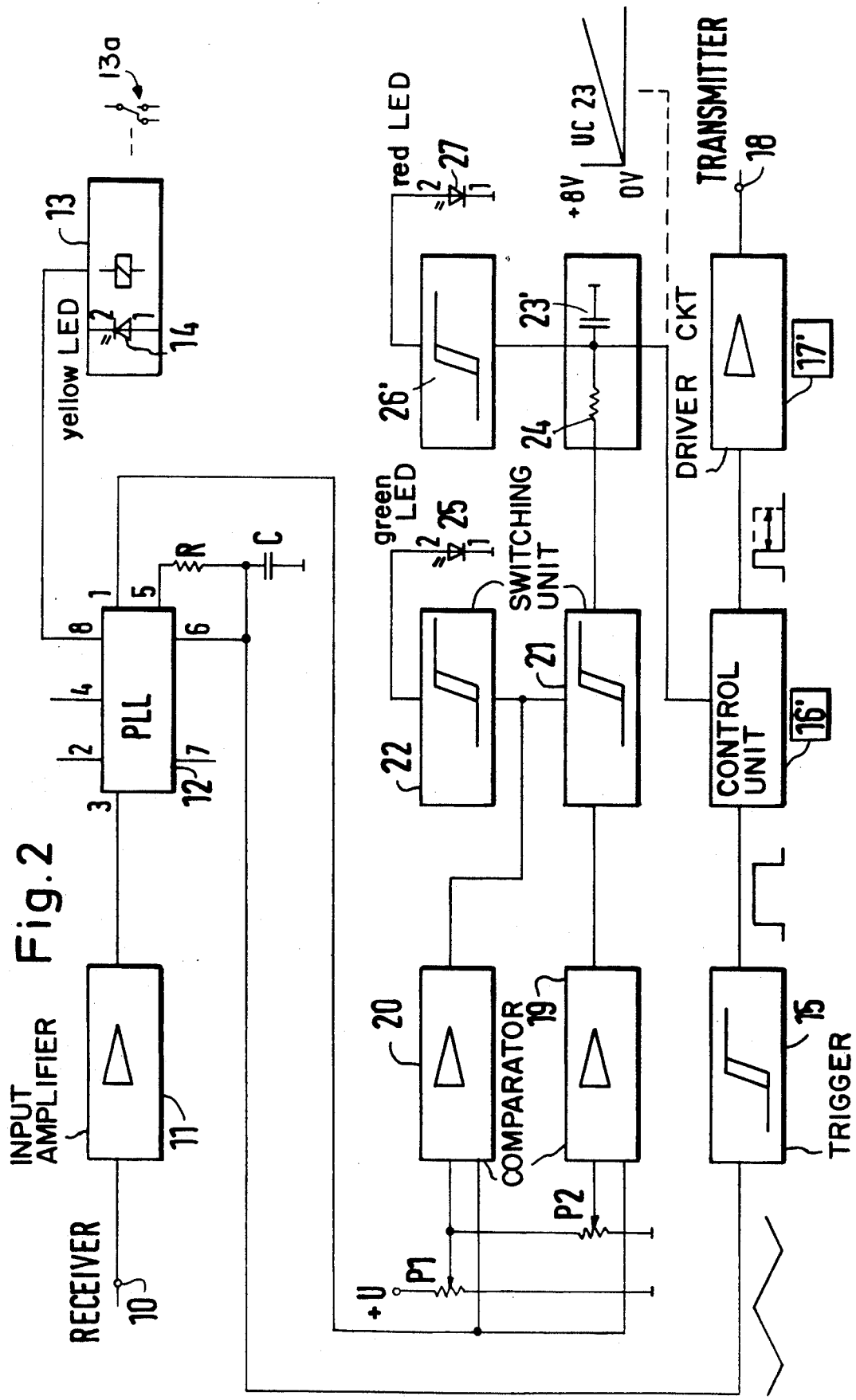
FIG. 2 shows a block diagram for regulating a light gate having a control stage for the duty cycle of the light pulses.

FIG. 2 shows an analogous construction of a light gate arrangement, in which all that has happened is that the amplitude control unit 16 has been replaced by a control unit 16' for controlling the duty cycle, the driver circuit 17' for the transmitter 18 generates a constant, non-variable current during the switch-on time of the pulses, and the capacitor 23' is connected to ground with its free plate.

A detailed circuit arrangement providing for the functions of trigger 15, control unit 16' and driver circuit 17' is shown in FIG. 3. There is indicated the delta voltage present at pin 6 of PLL-IC 12, which delta voltage oscillates between 3.0 V and 4.8 V. This signal is passed through a voltage follower 30, at the output of which the same delta signal is present. Through a rectifying circuit formed by resistor R45, diode D8 and capacitor C16, a constant reference voltage is transmitted through potentiometer P4 to the inverting input of a differential amplifier 31. The non-inverting input receives the delta signal through resistor R44. By this arrangement, the output of differential amplifier 31 is "high" if the delta voltage exceeds the rectified voltage at the inverting input of the differential amplifier 31. By means of potentiometer P4, the voltage at the inverting input is adjusted to be 3.9 V so that a duty cycle of 50% is obtained.

The positive voltage of the charged capacitor 23' is transmitted by a voltage follower 32 and through a tap of potentiometer P5 to a summation point at the inverting input of differential amplifier 31.

Potentiometer P5 is set such that the voltage at the inverting input of differential amplifier 31 is 4.8 V if capacitor 23' is fully charged, i.e., its positive plate has a potential of 8 V. In this case the broken line shown within the delta voltage of FIG. 3 is shifted to the upper 4.8 V level so that the duty cycle is practically 0. Therefore, by means of capacitor 23' the broken line indicated within the delta voltage of FIG. 3 can be shifted between the drawn position and the upper 4.8 V level, thereby varying the duty cycle of the pulses formed by the differential amplifier 31.

To the output of differential amplifier 31, a voltage controlled current source is connected through a diode D9. The current source is formed by transistor T7 connected with its collector to the positive voltage +12 V through resistor R46 and with its emitter to an output terminal through resistor R47.

In the illustrated embodiment, differential amplifier 31 serves as trigger 15 when fed by the output signals of voltage follower 30 and simultaneously serves as controlled unit 16' by the addition of the voltage obtained from capacitor 23' through potentiometer P5.

It is common to both circuits that the plate which determines the signal level of the capacitor 23 and is not connected to the +8 V voltage source or to ground is connected to a trigger 26 or 26' which switches through if the potential of this plate of the capacitor 23 becomes too high. Due to the switching-through of the trigger 26 (inverting in the example of FIG. 2), a red light-emitting diode 27 lights up, which indicates that the contamination of the transmitter-receiver section 18, 10 has now become too heavy, or that the installation is faulty in another way.

The invention is intended to cover all modifications and improvements which are evident to those of skill in the art and which fall within the scope of the claims.

What is claimed is:

1. A light switching device comprising:
   a) a transmitter for generating light;
   b) a control circuit for controlling the light transmitted by said transmitter;
   c) a receiver for receiving said light, said receiver generating an indication signal varying with the intensity of the received light;
   d) a first comparator having a first input for receiving said indication signal and a second input for receiving a first reference voltage, said first comparator producing a first comparison signal having a first state when said first reference voltage is greater than said indication signal and a second state when said first reference voltage is less than said indication signal;
   e) a second comparator having a first input for receiving said indication signal and a second input for receiving a second reference voltage, different from said first reference voltage, said second comparator producing a second comparison signal having a first state when said second reference voltage is greater than said indication signal and a second state when said second reference voltage is less than said indication signal;
   f) a charge storage device, coupled to said first comparator for storing a charge amount which varies based on said first comparison signal, said storage device increasing the charge amount when said first comparison signal is in one of said first and second states, and decreasing the charge amount when said first comparison signal is in the other of said first and second states;
   g) a switching unit interposed between said first comparator and said charge storage device for connecting and disconnecting said first comparison signal to said charge storage device in response to said second comparison signal; and
   h) said control circuit coupled to said charge storage device for adjusting the transmitter in response to the charge amount.

2. A light switching device as recited in claim 1 wherein said control circuit controls the power of said transmitter.

3. A light switching device as recited in claim 1 further comprising means coupled to said charge storage device for providing an indication when said indication signal indicates that the received light is below a predetermined threshold.

4. A light switching device as recited in claim 3, wherein said means for providing an indication includes a light emitting diode.

5. A light switching device as recited in claim 1, wherein said receiver includes a phase locked loop (PLL) connected to a relay device for controlling said relay device in response to the amount of light received.

6. A light switching device as recited in claim 1, wherein said indication signal varies inversely with the intensity of light received by said receiver.

7. A light switching device as recited in claim 1 wherein said charge amount remains unchanged when said switching unit disconnects said first comparison signal from said charge storage device.

8. A light switching device as recited in claim 1 wherein said first and second reference voltages and said indication signal are selected such that said second comparison signal is triggered between its first and second states in response to a lower level of received light than said first comparison signal.

9. A light switching device as recited in claim 1, wherein said control circuit adjust the transmitter to vary the amplitude of the transmitted light.

10. A light switching device as recited in claim 1, wherein said control circuit adjust the transmitter to vary the duty cycle of the transmitted light.

11. A light switching device as recited in claim 1, wherein said charge storage device comprises a capacitor.

12. A light switching device as recited in claim 11, wherein said capacitor is charged and discharged in response to said first comparison signal.

13. A light switching device as recited in claim 12, wherein said first comparator connects said capacitor to one of a ground potential or a voltage source based on the first and second states of said first comparison signal.

14. A light switching device as recited in claim 1, further comprising means for adjusting said first and second reference voltages.

15. A light switching device as recited in claim 14, wherein said adjusting means includes a potentiometer.

16. A light switching device as recited in claim 14, wherein said adjusting means includes a first and second potentiometer for said first and second comparator respectively.

17. A light switching device as recited in claim 1, wherein said first and second potentiometers have taps and wherein the taps are connected in series.

* * * * *